No. 774,331. Patented November 8, 1904.

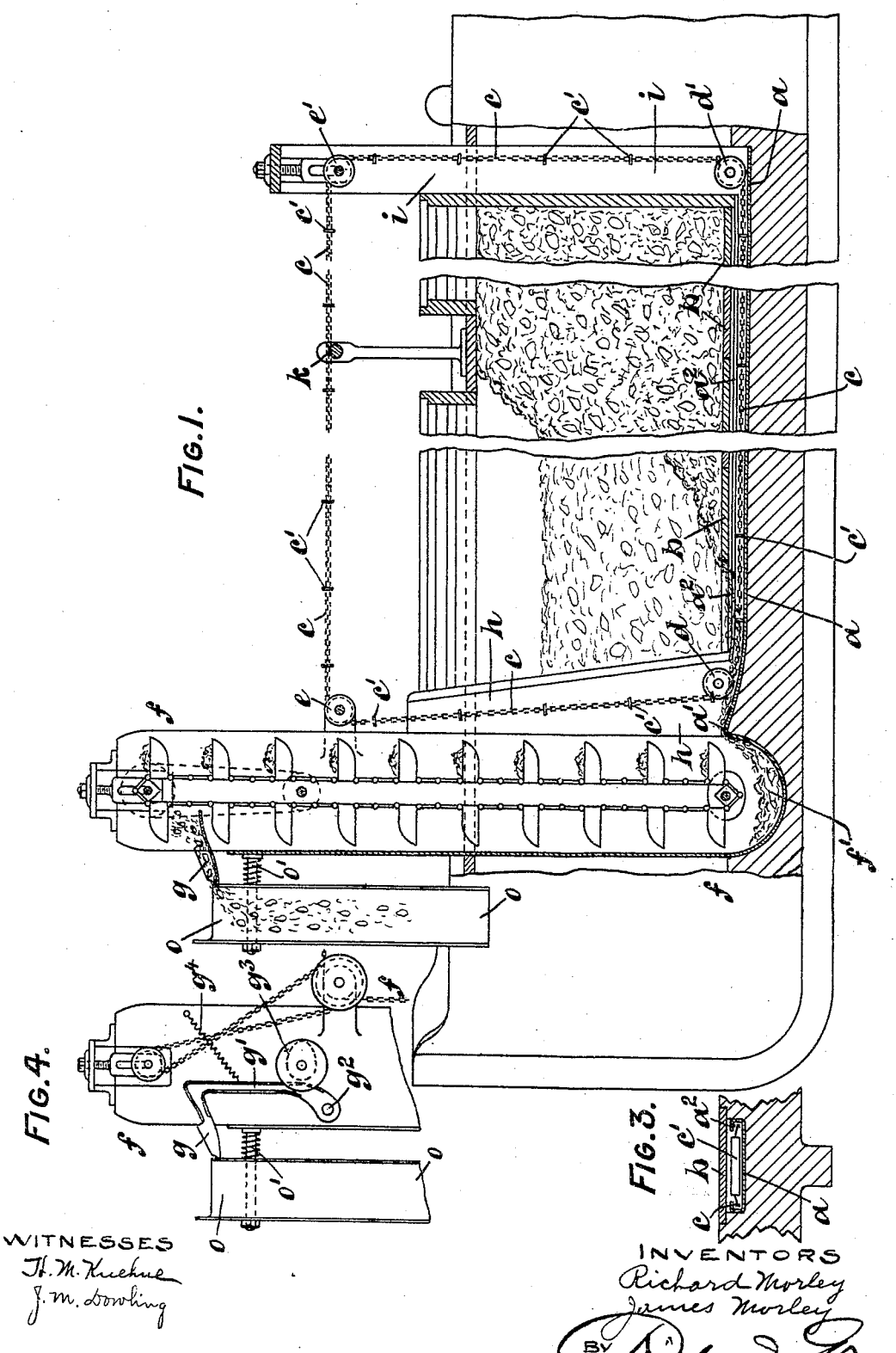

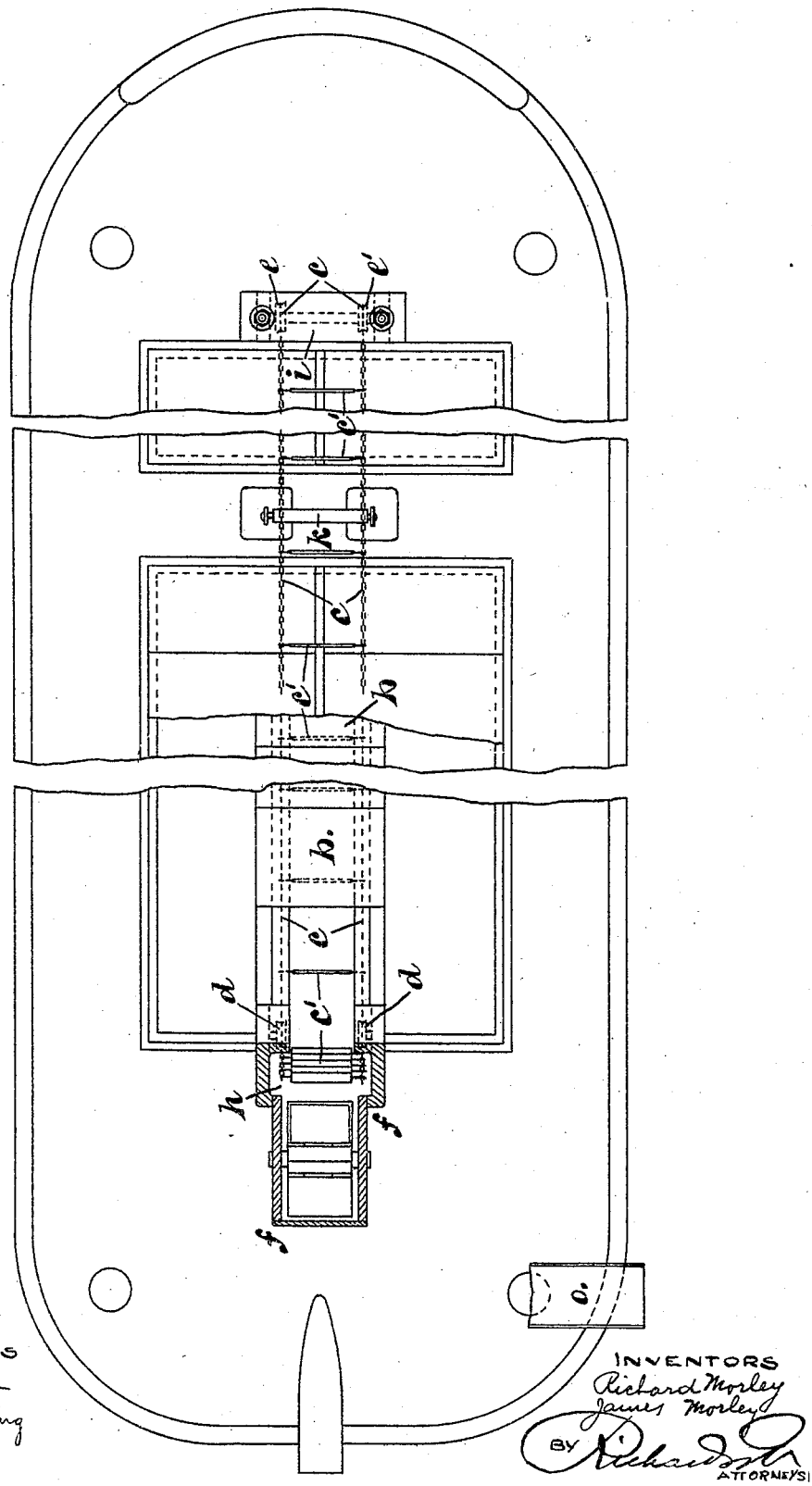

UNITED STATES PATENT OFFICE.

RICHARD MORLEY AND JAMES MORLEY, OF LIVERPOOL, ENGLAND.

DEVICE FOR DISCHARGING BARGES, LIGHTERS, OR OTHER CARGO VESSELS.

SPECIFICATION forming part of Letters Patent No. 774,331, dated November 8, 1904.

Application filed February 17, 1903. Serial No. 143,857. (No model.)

*To all whom it may concern:*

Be it known that we, RICHARD MORLEY and JAMES MORLEY, subjects of the King of England, and residents of Liverpool, in the county of Lancaster, England, have invented certain new and useful Improvements in or Connected with the Discharging of Barges, Lighters, or other Cargo Vessels, of which the following is a specification.

This invention has reference to the discharging of coal and other material in bulk from barges, lighters, and other cargo vessels; and it has more particularly for its object and effect to provide an improved means and arrangement of machinery for effecting this discharge of cargo in bulk mechanically from the holds of the vessels referred to and to deliver it into ships, railway wagons, onto quays and other places and without the employment of hand labor.

According to this invention the vessel or hold of the vessel is provided with a chain or like conveyer of continuous form extending along its floor or the hold, along which it moves in one direction and passes up at one end and then moves overhead in the opposite or return direction to the other end of the vessel or hold. The portion of the conveyer which moves along the floor will be supported and travel along iron or metal plating forming a bed for it, and it passes under a roller at each end of the floor. Normally the way or passage in the floor of the vessel in which the conveyer moves will be covered over by hatches or sectional coverings, and the vessel or hold will be filled with these hatches or coverings in place. At one or the other end of the vessel or hold a suitable bucket or analogous elevator is employed, into the well of which the conveyer will discharge the coal or other material moved by it, and this elevator will lift the material supplied to it by the conveyer onto a discharge or tip plate at the upper end, which delivers the material into a chute for conducting it onto the ship or place required. In one form the conveyer may be of chain type, with lateral bars which are supported and slide on the metal floor above referred to, and this conveyer-chain is conducted at the overhead portion by supporting wheels or pulleys. The end of the vessel or hold containing the material in bulk where the chain conveyer passes out has a gap in the bottom to allow it to pass, and the guide-rollers are placed outside of the same.

The barge or hold of the vessel, as the case may be, is filled with the hatches or covering over the conveyer. To discharge the vessel, one of these coverings or hatches—say at one end—is lifted up by means of a boat-hook, chain, or the like, and the conveyer and elevator being in operation the coal or material which will rest upon the conveyer at this uncovered part will be conveyed away by the drawing or scraping action along the metal floor and discharged into the elevator-well, from whence it is lifted up and delivered into the discharge-chute.

When the material from the part of the barge or vessel adjacent to the uncovered part of the conveyer has been removed, a further hatch or cover or a plurality of same is or are taken up and other coal or material is conveyed away and discharged in a like manner. In this way the whole of the contents of the vessel or hold can be sectionally conveyed away and discharged mechanically and the trim of the vessel can be regulated at will.

In one construction the receiving-table or chute for the material from the elevator-buckets can be moved in and out by an eccentric or other motion to receive the material falling from the buckets successively and to move out and not to allow them to pass. This prevents the material and dust from falling into the lower part of the elevator.

In the drawings illustrating the invention, Figure 1 is a sectional elevation showing a barge with our improvements applied; and Fig. 2 is the plan, partly in section, of Fig. 1. Fig. 3 is a cross-section through the conveyer and bottom of the vessel, and Fig. 4 is an outside view of the upper part of the elevator.

Referring now to the drawings, *a* designates the iron or steel plating or plateway in the bottom of the vessel providing the surface along which the conveyer moves and the material is moved, and *b* represents the hatches or covers, which fit over the conveyer and plateway in the bottom of the vessel.

The conveyer shown consists of chains $c$ at each side and transverse bars $c'$, and it passes under pulleys $d\ d'$ in the bottom of the vessel at each end of the plateway $a$ and over pulleys $e\ e'$, standing above the deck of the vessel.

$f$ designates generally the bucket elevator, having its well $f'$ in the bottom of the vessel, and the plateway leads into this well. At the part adjacent to the pulleys $d$ the plateway is curved upward at $a'$ to follow somewhat the curvature of the pulleys and run of the conveyer $c\ c'$. By this the delivery of the material into the elevator $f$ is better performed.

The material elevated by the elevator $f$ is discharged by its buckets onto a vibrating inclined table or chute $g$, this chute $g$ being supported on arms $g'$, hinged at $g^2$ and operated by the cam $g^3$, which is driven in a suitable way from the elevator-driving mechanism. The return action of the vibrating platform $g$ is effected by a spring $g^4$.

The material with which the vessel is loaded is in the case shown prevented from resting upon the chains $c$ of the conveyer along the bottom of the plateway by the flanges $a^2$, and these flanges may be provided by making the plates in vertical channel form at their edges. With some forms of chains, however, this is not required.

At the end of the vessel next the elevator $f$, where the chain conveyer passes upward and out, there is a gap or way $h$ in the bottom extending up above the deck, up which the chains pass. When the vessel is full, boards or covers will be laid across the front edges of these gaps or ways, so as to keep the material away from this part of the conveyer and within the hold. The opposite end of the vessel, where the chain conveyer passes down from the roller $e'$ to the roller $d'$, there is a vertical shaft $i$, down which it descends. Between the wheels $e$ and $e'$ there will be a number of intermediate supporting rollers or bars $k$, carried from the deck of the vessel.

When the vessel is being loaded, the hatches $b$ are placed over the conveyer $c\ c'$, and consequently the burden of the material is entirely kept off the conveyer.

In discharging the vessel the conveyer and elevator are set in motion, being driven from a suitable source of power, and the covers or boards over the ways or gaps $h$ are removed, the result being that the material at this end will first be taken by the buckets of the elevator $f$. When the material which would naturally fall into conveyer through the front open space between the ways $h$ has been discharged, the hatch or cover $b$ next the wheels $d$ will be taken off, the effect of which is that the material at that end of the cargo will fall onto and be taken away by the conveyer and delivered to the elevator, the buckets of which are driven at such a rate as will take the feed of the conveyer readily.

The material is taken away gradually by the conveyer $c\ c'$ by the removal of the hatches $b$ successively, and eventually in this way the whole bulk or cargo is discharged. If the floor of the vessel on each side of the plateway $a$ is at an angle that will not retain any material, all such material will flow automatically onto the conveyer; but if these side floors are not on such an inclination the material will have to be trimmed onto the conveyer from each side after the center portion has passed onto the conveyer and been removed.

This invention is specially useful for coaling ships where the coaling takes place through ports in the side of the ship, and to meet different sizes of ships or heights of delivery the elevator $f$ may be adapted so as to be lengthened or shortened by introducing or taking out lengths.

When the buckets discharge themselves, the contents are received by the table or chute $g$, and after receiving the contents it moves away from under the bucket and allows it to pass. Then after it has passed the table is pulled back by the spring $g^4$ to the receiving position again. The discharge from the table $g$ is onto a chute $o$, supported upon a bar $o'$ on the elevator, its discharge end being entered into the ship's coaling-port at the side or other receiving part, as will be understood. This chute should be loosely mounted on the bar $o'$, so that the movement of the barge in relation to the ship can take place without straining the parts, and it may have a spring connected with it to prevent it swinging loosely about.

If the elevator $f$ be sufficiently inclined so as to discharge directly onto the chute $o$, the vibrating discharging-table or chute $g$ would not be required; but an inclined elevator will occupy a greater length of the vessel.

While the particular arrangement shown is an advantageous one, yet the invention is not restricted to it, and the various features or novel characteristics of the invention are hereinafter specified or referred to in the claiming clause.

Having now described our invention, what we claim as new, and desire to secure by Letters Patent, is—

In a mechanically-discharging barge or vessel, a bucket elevator having a vibrating receiving-table at its upper part, adapted to move into and out of the path of the buckets; substantially as described.

In witness whereof we have hereunto set our hands in presence of two witnesses.

RICHARD MORLEY.
JAMES MORLEY.

Witnesses:
S. GOODALL,
JOHN H. WALKER.